Patented Aug. 7, 1923.

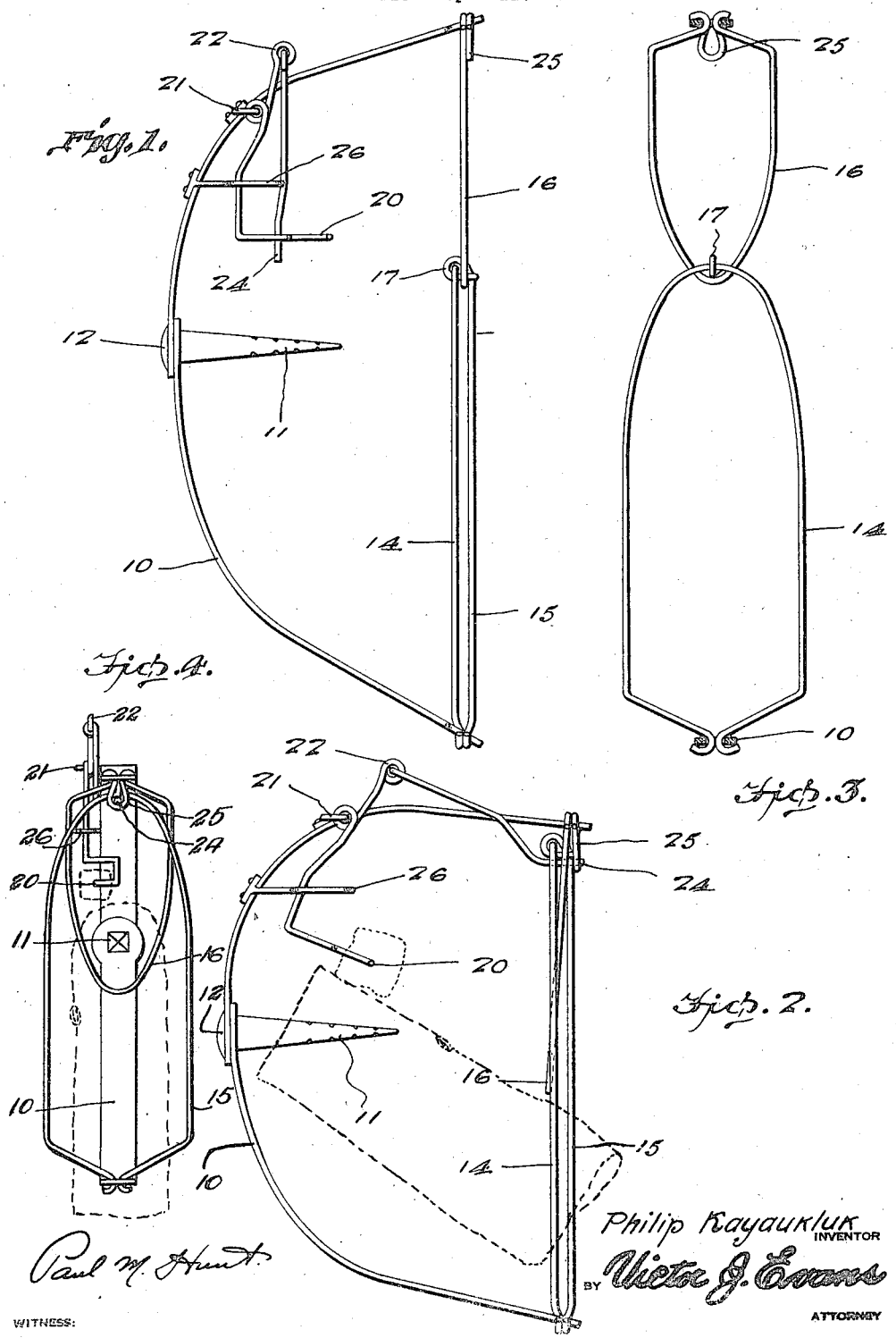

1,464,429

UNITED STATES PATENT OFFICE.

PHILIP KAYAUKLUK, OF UNALAKLEET, TERRITORY OF ALASKA.

ANIMAL TRAP.

Application filed September 11, 1822. Serial No. 587,455.

*To all whom it may concern:*

Be it known that I, PHILIP KAYAUKLUK, citizen of United States, residing at Unalakleet and Territory of Alaska, have invented new and useful Improvements in Animal Traps, of which the following is a specification.

The object of this invention is to provide a trap especially designed for marten and other small fur bearing animals.

A further object is to provide a trap to be secured to the limb of a tree, or similar object, and so constructed and mounted that the animal will be caught as it travels along the limb and approaches the bait positioned within the frame of the trap and adjacent to the limb.

A still further object is to provide a trap comprising a U-shaped resilient element with an inwardly extending spike to be driven into the end of the limb, said U-shaped element mounting the jaws and holding them in correct position with reference to the limb or supporting means.

With the foregoing and other objects in view, the invention consists in the novel construction and arrangement of elements described and claimed, it being understood that modifications may be made within the scope of the claims without departing from the spirit of the invention.

In the drawings, Figure 1 is a view of the trap in side elevation; Figure 2 is a side elevation showing the trap set and mounted on the limb of a tree; Figure 3 is a section vertically through Figure 1, looking toward the right; Figure 4 is a front elevation, looking from the right in Figure 2.

The U-shaped frame 10 is formed of spring steel, and mounted centrally thereof is a spike 11 having a head 12, the spike being adapted to be driven into the end of a limb of a tree, or other supporting member, in such position that the lower end of the frame will be below the limb, and the upper end will be above the limb. The frame is therefore set in an approximately vertical position.

A plurality of U-shaped elements 14 and 15 constitute the lower jaw, and also constitute guides between which the upper jaw 16 operates. These jaws may be formed of heavy wire or small rods, and the element 15 is provided with an eye 17 through which the upper portion of the element 14 passes. The lower ends of the elements 14 and 15 are connected in any suitable manner with the lower end of the U-frame 10.

The eye member 17 is offset from the plane of the member 15, and provides for the spacing of the elements 14 and 15 of the lower jaw.

The upper jaw 16 is operable in a vertical direction between the spaced elements 14 and 15, and when the trap is set the lower loop portion of the jaw 16 provides considerable space between the upper arched portion of the lower jaw, this spaced portion or opening for the trap being adjacent to the limb on which the device is mounted. An animal traveling along the limb will naturally enter the opening in approaching the bait carried on a bait holder 20. This bait holder is pivotally mounted at 21, and pivotally connected with the end 22 thereof is a trigger 24.

When the springs or resilient element 10 is placed under pressure, tending to bring the ends thereof closer to each other, the movable jaw 16 assumes the position shown in Figure 2, and the trigger 24 passes through eye member 25 through the upper arched portions of the elements 14 and 15. The bait having been previously placed in position, the trap is ready for use, and when the bait holder 20 is moved, incident to the removal of the bait, the trigger 24 is released, and the resilient element 10 causes the upper jaw to move vertically tending to assume its original position, the neck of the animal being caught between the jaws specified. A guiding element for the bait holder includes a loop portion 26 through which the holding device 20 passes, this guiding member being secured to the spring 10. Since the two elements of the lower jaw pass around the limb of the tree, the trap is maintained in position when properly spiked in the manner referred to.

What is claimed is:—

1. A trap comprising a pair of relatively slidable jaws, a spring controlling one of the jaws, jaw retaining means for holding the loops in registered relation, bait holding means, and means for rigidly mounting the trap with reference to the limb of a tree so that said limb passes into one of the loops of the trap.

2. A trap comprising a pair of relatively slidable jaws, a U-shaped spring controlling one of the jaws, a rigidly mounted device projecting inwardly from the U-shaped spring and adapted to enter the end of the limb of a tree when one of the jaws passes around the limb, a bait holding device, and means connected with the bait holding device and acting to hold the jaws in registered relation when the trap is in set position.

3. A trap comprising a pair of relatively movable jaws, one jew acting as a guide for the other jaw, a U-shaped spring controlling one of the jaws, a rigidly mounted device projecting inwardly from the U-shaped spring and adapted to enter the end of the limb of a tree when one of the jaws passes around the limb, a bait holding device, and means connected with the bait holding device and acting to hold the jaws in registered relation when the trap is in set position.

4. A trap comprising a plurality of jaws one of which is proportioned to pass around a supporting element, the other jaw being of U-form and movable with reference to the jaw passing around the supporting element, the jaws maintaining approximately parallel relation, a spring controlling the position of the movable jaw, the spring being of U-form, and a limb engaging device carried rigidly by the central portion of the U-element, and projecting in the direction of the flared ends of said U element and between said ends.

5. In a trap, a U-shaped spring, a rigidly mounted spike projecting inwardly from the spring, a bait holding device carried by the spring, a trigger connected with the bait holding device, a lower jaw connected with one end of the spring and comprising a pair of spaced loop members, an upper jaw of loop form connected with the opposite end of the spring and passing between the elements of the jaw first named, and means for retaining the trigger when pressure is placed on the ends of the spring causing said ends to approach and the jaws to register when setting the trap.

In testimony whereof I affix my signature.

PHILIP KAYAUKLUK.